US006971002B2

(12) United States Patent
Austen et al.

(10) Patent No.: US 6,971,002 B2
(45) Date of Patent: Nov. 29, 2005

(54) METHOD, SYSTEM, AND PRODUCT FOR BOOTING A PARTITION USING ONE OF MULTIPLE, DIFFERENT FIRMWARE IMAGES WITHOUT REBOOTING OTHER PARTITIONS

(75) Inventors: Christopher Harry Austen, Austin, TX (US); Van Hoa Lee, Cedar Park, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 09/925,584

(22) Filed: Aug. 9, 2001

(65) Prior Publication Data

US 2003/0033512 A1  Feb. 13, 2003

(51) Int. Cl.[7] ...................... G06F 15/177; G06F 9/445; G06F 12/00
(52) U.S. Cl. ................ 713/1; 713/2; 711/173
(58) Field of Search ........................ 713/1, 2; 711/162, 711/173

(56) References Cited

U.S. PATENT DOCUMENTS

| | | | | |
|---|---|---|---|---|
| 4,564,903 A | | 1/1986 | Guyette et al. ............. | 364/300 |
| 4,843,541 A | | 6/1989 | Bean et al. ................. | 364/200 |
| 5,345,590 A | | 9/1994 | Ault et al. .................. | 395/650 |
| 6,430,663 B1 | * | 8/2002 | Ding .......................... | 711/162 |
| 6,684,343 B1 | * | 1/2004 | Bouchier et al. ............ | 714/4 |
| 6,690,400 B1 | * | 2/2004 | Moayyad et al. ........... | 345/779 |
| 6,725,317 B1 | * | 4/2004 | Bouchier et al. ........... | 710/312 |

OTHER PUBLICATIONS

John Whitworth, Patition Magic and LILO, Oct. 5, 1998, Newsgroups: linux.redhat.install, pp. 2.*
IBM Technical Disclosure Bulletin, vol. 39, No. 12, Dec. 1996, "Hypervisor High Performance Synchronous Dispatch for Coupled Systems", one page.
IBM Technical Disclosure Bulletin, vol. 38, No. 04, Apr. 1995, "VM MPG Operating as a DRF Hypervisor as a First Level Guest Under PR/SM", p. 325.
IBM Technical Disclosure Bulletin, vol. 36, No. 03, Mar. 1993, "Sharing Read-Only Memory among Multiple Logical Partitions", pp. 303-304.
IBM Technical Disclosure Bulletin, vol. 39, No. 12, Dec. 1996, "Highly Parallel Coupling Facility Emulator/Router with Shadowed Link Buffers", 2 pages.
IBM Technical Disclosure Bulletin, vol. 39, No. 06, Jun. 1996, "Coordinating Multiple Server Partitions to Enter Power-Save State", pp. 235-239.

* cited by examiner

Primary Examiner—Thomas Lee
Assistant Examiner—Suresh K Suryawanshi
(74) Attorney, Agent, or Firm—Duke W. Yee; Mark E. McBurney; Lisa L. B. Yociss

(57) ABSTRACT

A method, system, and product within a logically partitioned computer system including multiple, different partitions are disclosed for booting a partition using one of multiple, different firmware images. These multiple, different firmware images are stored in the computer system. One of the partitions is rebooted utilizing one of the firmware images without rebooting other ones of the partitions.

24 Claims, 4 Drawing Sheets

100 DATA PROCESSING SYSTEM

METHOD, SYSTEM, AND PRODUCT FOR BOOTING A PARTITION USING ONE OF MULTIPLE, DIFFERENT FIRMWARE IMAGES WITHOUT REBOOTING OTHER PARTITIONS

BACKGROUND OF THE INVENTION

1. Technical Field

The present invention relates generally to the field of computer systems and, more specifically to computer systems having multiple, logical partitions. Still more particularly, the present invention relates to a logically partitioned computer system, method, and product for booting one of the partitions using one of multiple, different firmware images.

2. Description of Related Art

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, is assigned a non-overlapping subset of the platform's hardware resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

Many logically partitioned systems make use of a hypervisor. A hypervisor is a layer of privileged software between the hardware and logical partitions that manages and enforces partition protection boundaries. The hypervisor is also referred to herein as partition management firmware or firmware. The hypervisor is responsible for configuring, servicing, and running multiple logical systems on the same physical hardware. The hypervisor is typically responsible for allocating resources to a partition, installing an operating system in a partition, starting and stopping the operating system in a partition, dumping main storage of a partition, communicating between partitions, and providing other functions. In order to implement these functions, the hypervisor also has to implement its own low level operations like main storage management, synchronization primitives, I/O facilities, heap management, and other functions.

Currently, only a single firmware image can exist within a logically partitioned computer system. This firmware image is used to boot each partition. Each partition, thus, boots from the same image. When the firmware image is modified, the entire boot process must be repeated with each partition being rebooted from the same modified firmware image.

Therefore, a need exists for a logically partitioned system, method, and product for maintaining multiple, different firmware images, and booting only one of the partitions using one of these firmware images, wherein there is no need to reboot the entire system.

SUMMARY OF THE INVENTION

A method, system, and product within a logically partitioned computer system including multiple, different partitions are disclosed for booting a partition using one of multiple, different firmware images. These multiple, different firmware images are stored in the computer system. One of the partitions is rebooted utilizing one of the firmware images without rebooting other ones of the partitions.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for maintaining a plurality of different firmware images, and for rebooting one of a plurality of different partitions using one of these images without rebooting other ones of the partitions. These multiple, different firmware images are stored in non-volatile memory in a logically partitioned computer system.

Each partition is associated with its own, unique partition table. In addition to other information stored in a partition table, an indicator within the partition table is used to indicate whether the partition associated with the table needs to be rebooted. Also stored within a partition table is an identifier which identifies one of the different firmware images.

When the indicator indicates that the partition associated with the partition table having the indicator needs to be rebooted, the computer system will copy the firmware image identified by the identifier stored in that partition table to the associated partition. This firmware image is then executed in order to boot only that partition. Other partitions are unaffected by the copying of the firmware image and the rebooting of the partition.

Figure 1:
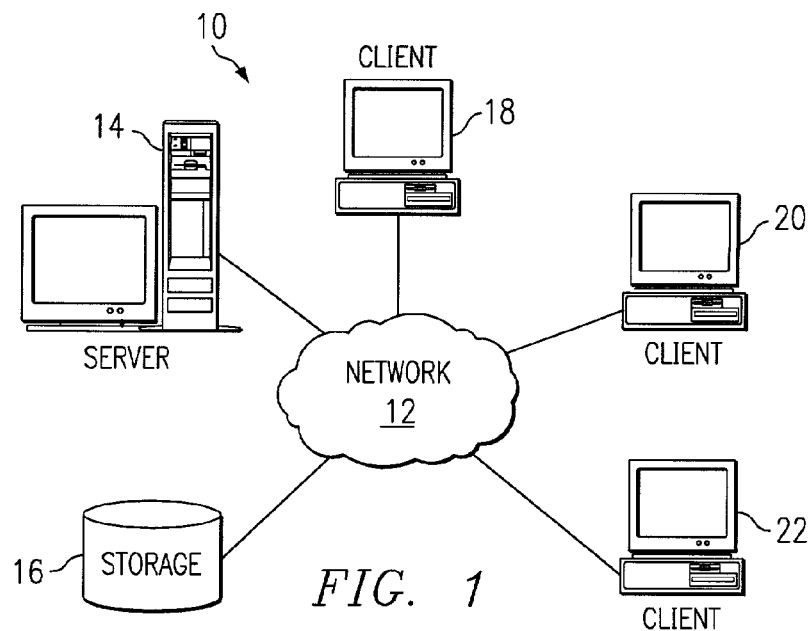
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
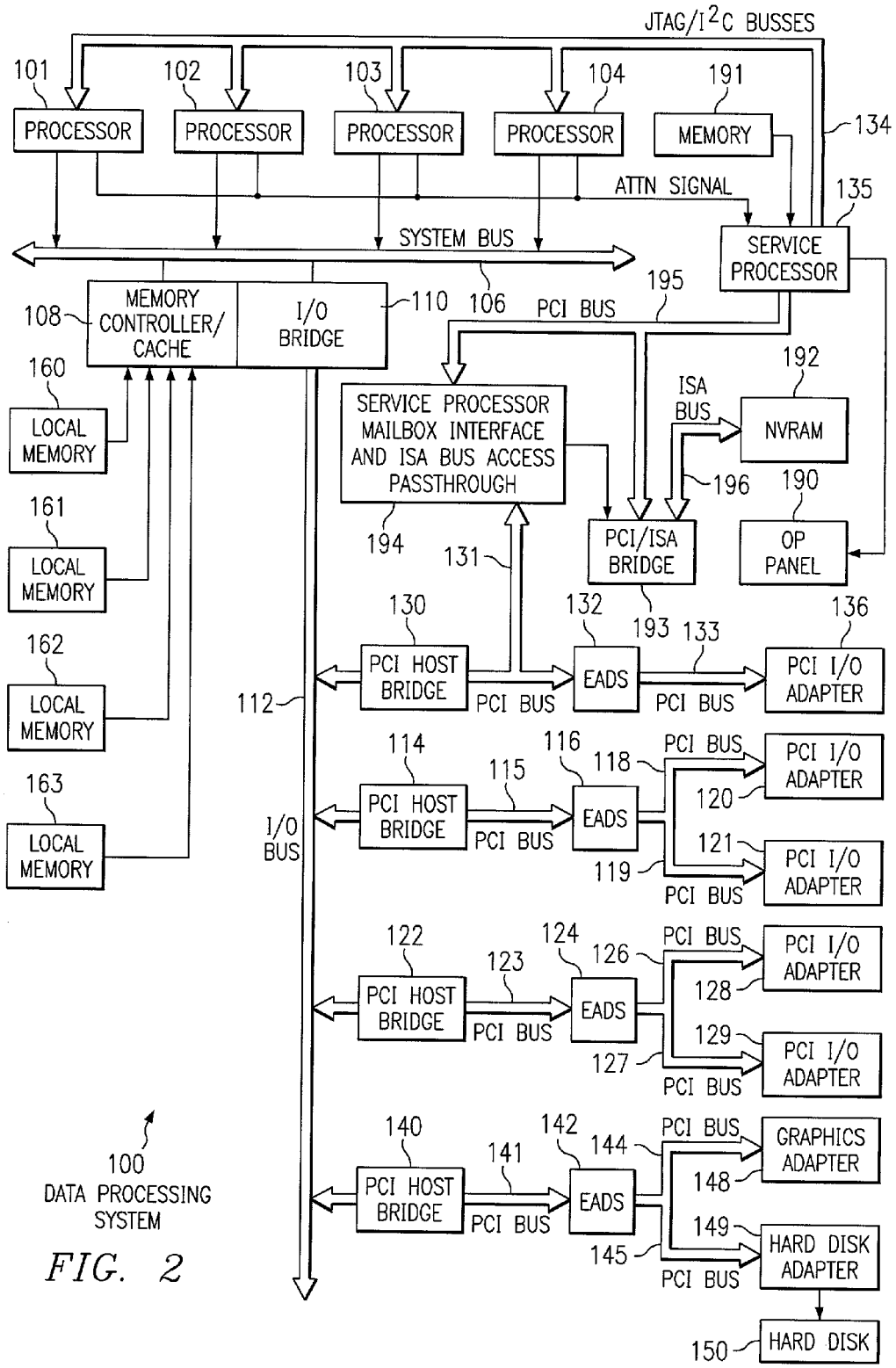
FIG. 2 is a more detailed block diagram of a data processing system in which the present invention may be implemented in accordance with the present invention.

FIG. 2 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 144 and 145 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
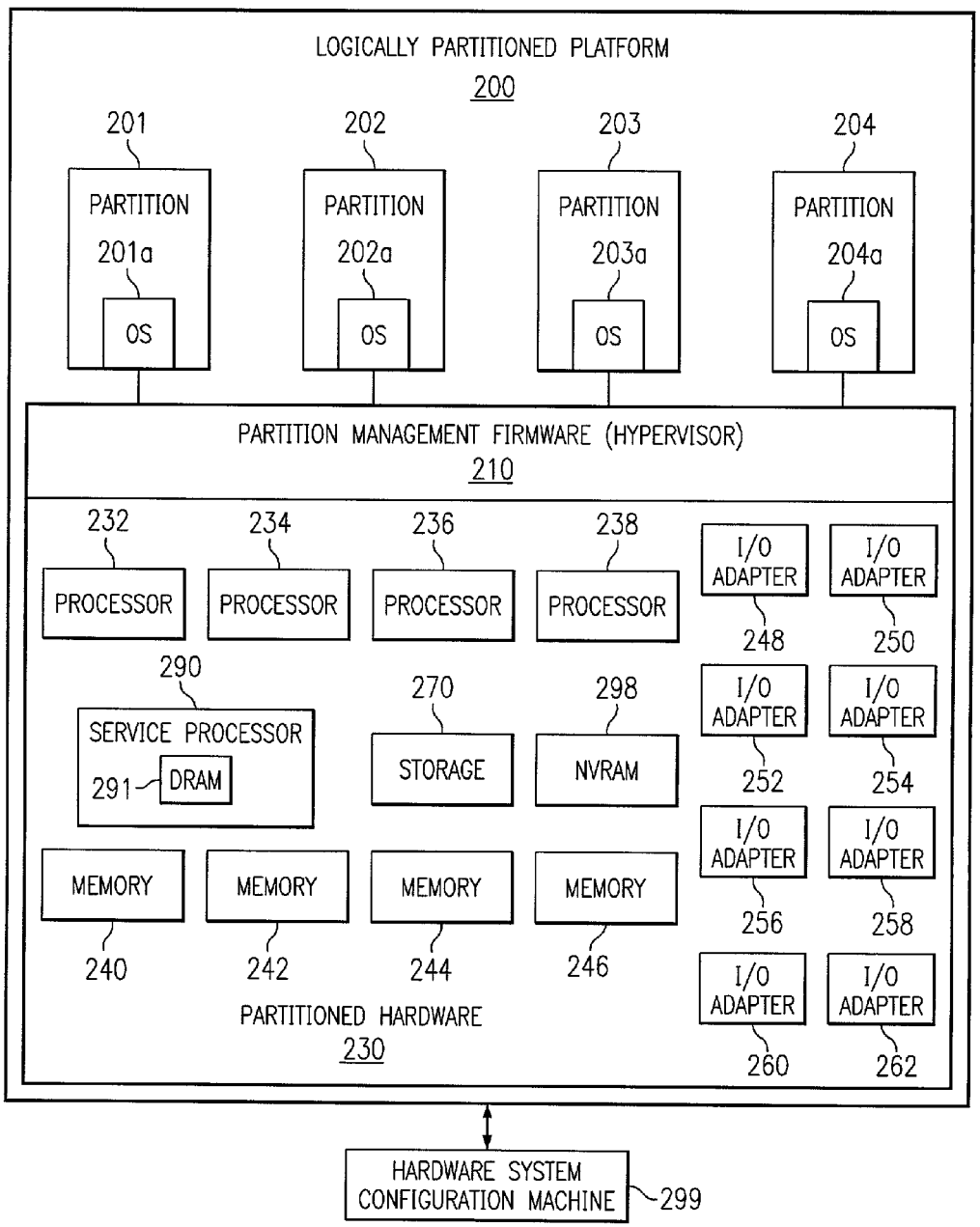
FIG. 3 is a block diagram of an exemplary logically partitioned platform in which the present invention may be implemented.

FIG. 3 is a block diagram of an exemplary logically partitioned platform in which the present invention may be implemented. Logically partitioned platform 200 includes partitioned hardware 230, partition management firmware, also called a hypervisor 210, and partitions 201–204. Operating systems 201a–204a exist within partitions 201–204.

Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298f and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A hardware system configuration (HSC) machine 299 may be coupled to data processing system 100 which includes logically partitioned platform 200. HSC 299 is a separate computer system that is coupled to service processor 290 and may be used by a user to control various functions of data processing system 100 through service processor 290. HSC 299 includes a graphical user interface (GUI) which may be used by a user to select a partition to be rebooted. Further, a listing of different firmware images that are stored within service processor memory 291 may be presented to the user utilizing the graphical user interface of HSC 299. The user may then select one of the listed firmware images to use to boot the selected partition as described below.

When a user selects a partition, HSC 299 transmits a request to service processor 290 to have service processor 290 update the partition table associated with the selected partition. Service processor 290 updates the partition table by setting an indicator within the table to indicate that the associated partition needs to be rebooted. In addition, HSC 299 transmits an identifier to service processor 290 which identifies the particular firmware image selected by the user. Service processor 290 then stores this identifier within the partition table associated with the selected partition.

As described in more detail below, hypervisor 210 routinely checks each partition table to determine a current state of the indicator stored in each table. When hypervisor 210 finds an indicator that indicates a partition needs to be rebooted, hypervisor 210 copies the firmware image identified within that partition table to the logical memory of the partition associated with the partition table. That firmware image is then executed within the partition causing only that partition to be rebooted. Other partitions are unaffected by this process.

Figure 4:
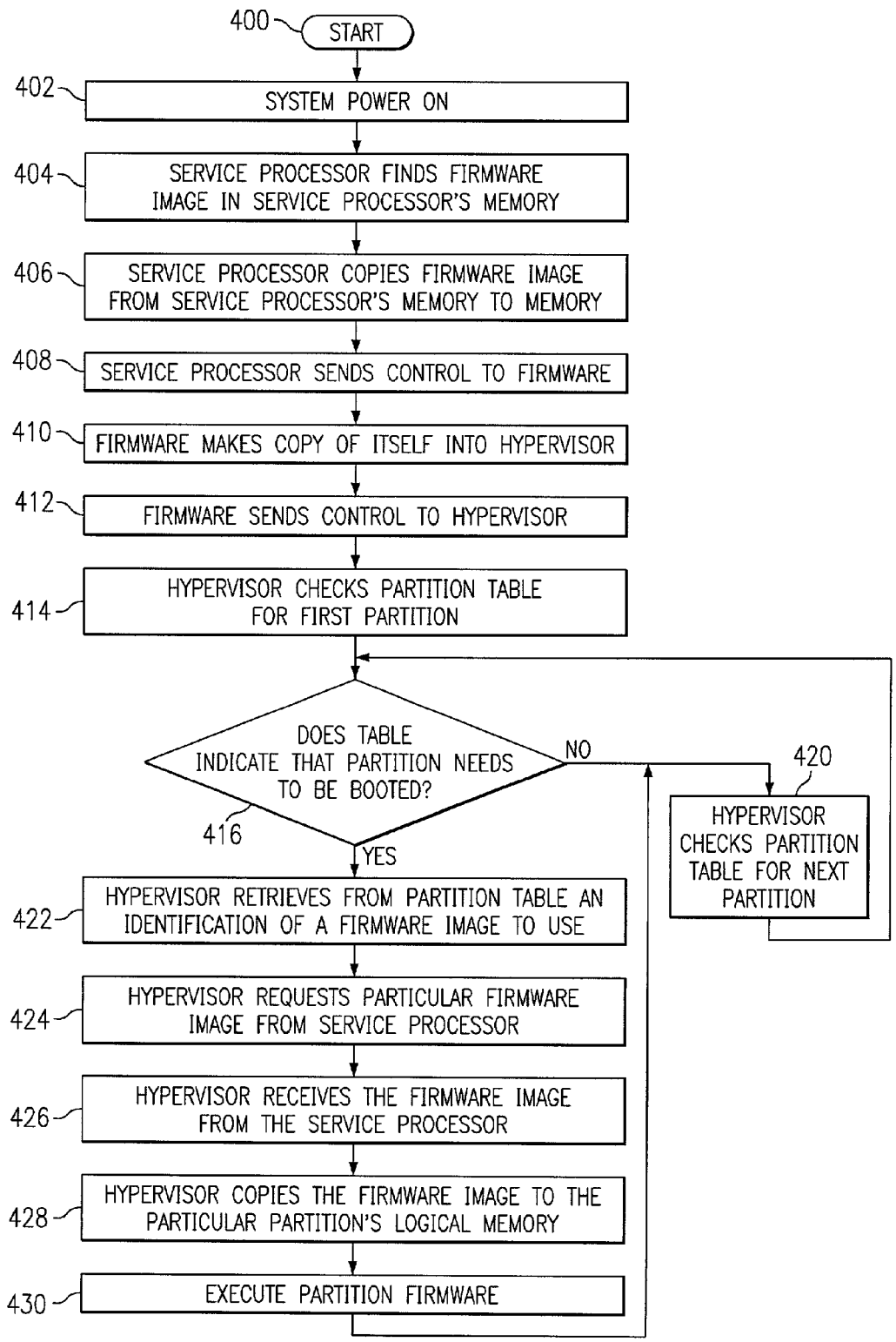
FIG. 4 illustrates a high level flow chart which depicts booting one partition using one of a plurality of different firmware images maintained by a logically partitioned computer system without the need for rebooting the entire system in accordance with the present invention.

FIG. 4 illustrates a high level flow chart which depicts booting one partition using one of a plurality of different firmware images maintained by a logically partitioned computer system without the need for rebooting the entire system in accordance with the present invention. The process starts as depicted by block 400 and thereafter passes to block 402 which illustrates the system being powered-on. Next, block 404 depicts service processor 290 finding a firmware image in the service processor's memory 291 to use when first powering-up the entire computer system.

Block 406 then illustrates service processor 290 copying the firmware image from the service processor's memory 291 to a memory device, such as memory 240–246. The process then passes to block 408 which depicts service processor 290 sending control to the firmware copied into memory 240–246. Next, block 410 illustrates the firmware in memory 240–246 copying itself into hypervisor 210.

Thereafter, block 412 depicts firmware in memory 240–246 sending control to hypervisor 210. Next, block 414 illustrates hypervisor 210 checking a partition table for a first partition. The process then passes to block 416 which depicts a determination of whether or not the partition table indicates that the partition associated with the partition table needs to be rebooted. If a determination is made that the partition associated with the partition table does not need to be rebooted, the process passes to block 420 which illustrates hypervisor 210 checking a partition table associated with a next partition. The process then passes back to block 416.

Referring again to block 416, if a determination is made that the partition associated with the partition table does need to be rebooted, the process passes to block 422 which illustrates hypervisor 210 retrieving from the partition table an identification of one of multiple, different firmware images to use. Next, block 424 depicts hypervisor 210 requesting the firmware image identified by the identification retrieved from the partition table.

The process then passes to block 426 which illustrates hypervisor 210 receiving the requested firmware image. Next, block 428 depicts hypervisor 210 copying the requested firmware image to the particular partition's logical memory. Thereafter, block 430 illustrates executing the firmware image copied into the partition. In this manner, only the particular partition is rebooted. The process then passes to block 420.

Figure 5:
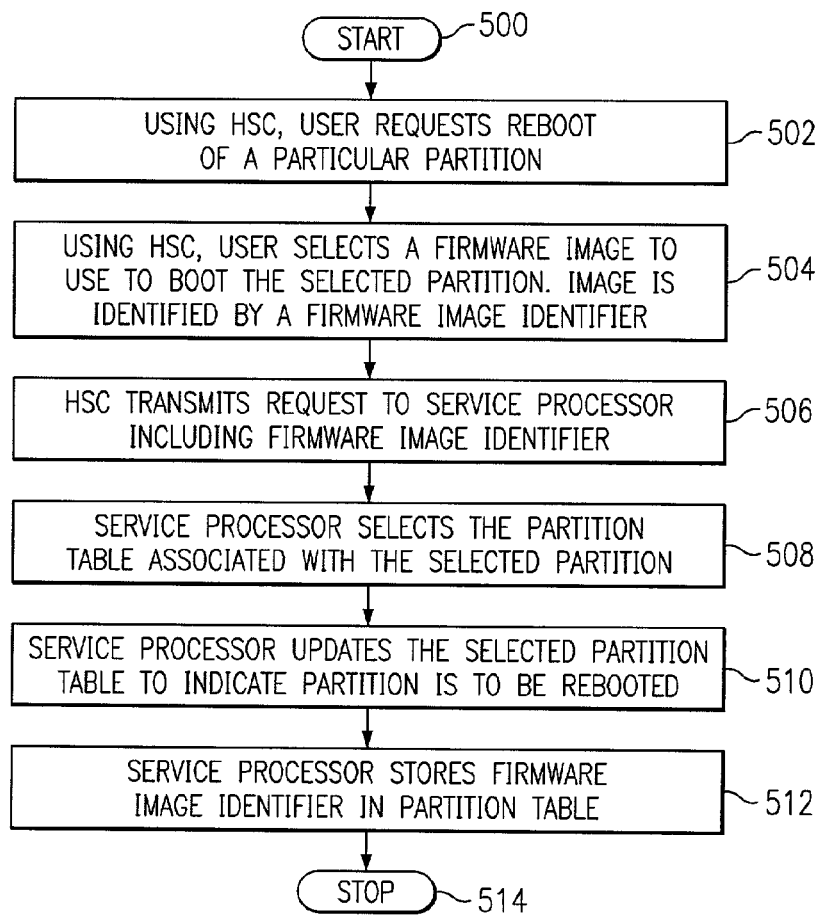
FIG. 5 depicts a high level flow chart which illustrates selecting one of a plurality of different firmware images to use to boot one of multiple, different partitions in a logically partitioned computer system in accordance with the present invention.

FIG. 5 depicts a high level flow chart which illustrates selecting one of a plurality of different firmware images to use to boot one of multiple, different partitions in a logically partitioned computer system in accordance with the present invention. The process starts as depicted by block 500 and thereafter passes to block 502 which illustrates permitting a user to request a reboot of a particular partition using the hardware system configuration (HSC) machine 299. Next, block 504 depicts permitting the user, who is using the HSC machine 299, to select one of multiple, different firmware images to use to boot the selected partition. The image is identified by a firmware image identifier, which is then included in the request.

The process then passes to block 506 which illustrates HSC 299 transmitting the request made by the user to service processor 290. The request identifies a particular partition and includes a firmware image identifier. Next, block 508 depicts service processor 290 selecting the partition table that is associated with the partition identified by the request. Thereafter, block 510 illustrates service processor 290 updating the selected partition table to indicate that the partition associated with the table is to be rebooted.

Block 512, then, depicts service processor 290 storing the firmware image identifier in the selected partition table. The process then terminates as illustrated by block 514.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logically partitioned computer system including a plurality of different partitions, said method comprising the steps of:

storing a plurality of different firmware images in said computer system, each one of said plurality of different firmware images capable of being executed during a power-on process to boot said computer system; and rebooting one of said plurality of partitions utilizing one of said plurality of firmware images without rebooting other ones of said plurality of partitions, rebooting said one of said plurality of partitions utilizing said one of said plurality of firmware images prior to booting an operating system in said one of said plurality of partitions.

2. The method according to claim 1, further comprising the step of selecting said one of said plurality of firmware images to use to reboot said one of said plurality of partitions.

3. The method according to claim 1, further comprising the step of associating a different, unique firmware image identifier with each of said plurality of firmware images.

4. The method according to claim 1, further comprising the steps of:

associating a different, unique firmware image identifier with each of said plurality of firmware images;

associating a different partition table with each one of said plurality of partitions;

providing an indicator within each said different partition table, said indicator indicating whether one of said plurality of partitions that is associated with said partition table needs to be rebooted; and providing an identifier within each said different partition table, said identifier identifying one of said plurality of firmware images.

5. The method according to claim 1, further comprising the steps of:

routinely checking each said partition table to determine whether said indicator included within each said partition table indicates that one of said plurality of partitions associated with each said partition table is to be rebooted;

in response to a determination that an indicator indicates that one of said plurality of partitions needs to be rebooted, rebooting said one of said plurality of partitions having said indicator that indicates said need to be rebooted.

6. The method according to claim 5, further comprising the steps of:

retrieving an identifier from said partition table that includes said indicator that indicates said need to be rebooted, said identifier one of said plurality of firmware images; and rebooting only said one of said plurality of partitions that includes said indicator that indicates said need to be rebooted utilizing said identifier retrieved from said partition table associated with said one of said plurality of partitions.

7. The method according to claim 1, further comprising the steps of:

providing a listing of said plurality of partitions;

providing a listing of said plurality of different firmware images;

receiving a selection of one of said plurality of partitions that is to be rebooted; and receiving a selection of one of said plurality of firmware images to use to reboot said selected one of said plurality of partitions.

8. The method according to claim 7, further comprising the steps of:

setting an indicator in a partition table associated with said selected one of said plurality of partitions, said indicator indicating that said one of said plurality of partitions has been selected to be rebooted; and storing an identification of said selected one of said plurality of firmware images in said partition table associated with said selected one of said plurality of partitions.

9. A computer program product stored in a computer recordable-type media in a logically partitioned computer system including a plurality of different partitions, comprising:

instruction means for storing a plurality of different firmware images in said computer system, each one of said plurality of different firmware images capable of being executed during a power-on process to boot said computer system; and instruction means for rebooting one of said plurality of partitions utilizing one of said plurality of firmware images without rebooting other ones of said plurality of partitions, rebooting said one of said plurality of partitions utilizing said one of said plurality of firmware images prior to booting an operating system in said one of said plurality of partitions.

10. The product according to claim 9, further comprising instruction means for selecting said one of said plurality of firmware images to use to reboot said one of said plurality of partitions.

11. The product according to claim 9, further comprising instruction means for associating a different, unique firmware image identifier with each of said plurality of firmware images.

12. The product according to claim 9, further comprising:

instruction means for associating a different, unique firmware image identifier with each of said plurality of firmware images;

instruction means for associating a different partition table with each one of said plurality of partitions;

instruction means for providing an indicator within each said different partition table, said indicator indicating whether one of said plurality of partitions that is associated with said partition table needs to be rebooted; and instruction means for providing an identifier within each said different partition table, said identifier identifying one of said plurality of firmware images.

13. The product according to claim 9, further comprising:

instruction means for routinely checking each said partition table to determine whether said indicator included within each said partition table indicates that one of said plurality of partitions associated with each said partition table is to be rebooted;

in response to a determination that an indicator indicates that one of said plurality of partitions needs to be rebooted, instruction means for rebooting said one of said plurality of partitions having said indicator that indicates said need to be rebooted.

14. The product according to claim 13, further comprising:

instruction means for retrieving an identifier from said partition table that includes said indicator that indicates said need to be rebooted, said identifier one of said plurality of firmware images; and instruction means for rebooting only said one of said plurality of partitions that includes said indicator that indicates said need to be rebooted utilizing said identifier retrieved from said partition table associated with said one of said plurality of partitions.

15. The product according to claim 9, further comprising:

instruction means for providing a listing of said plurality of partitions;

instruction means for providing a listing of said plurality of different firmware images;

instruction means for receiving a selection of one of said plurality of partitions that is to be rebooted; and instruction means for receiving a selection of one of said plurality of firmware images to use to reboot said selected one of said plurality of partitions.

16. The product according to claim 15, further comprising:

instruction means for setting an indicator in a partition table associated with said selected one of said plurality of partitions, said indicator indicating that said one of said plurality of partitions has been selected to be rebooted; and instruction means for storing an identification of said selected one of said plurality of firmware images in said partition table associated with said selected one of said plurality of partitions.

17. A logically partitioned computer system including a plurality of different partitions, comprising:

a plurality of different firmware images being stored in said computer system, each one of said plurality of different firmware images capable of being executed during a power-on process to boot said computer system; and said computer system for rebooting one of said plurality of partitions utilizing one of said plurality of firmware images without rebooting other ones of said plurality of partitions, rebooting said one of said plurality of partitions utilizing said one of said plurality of firmware images prior to booting an operating system in said one of said plurality of partitions.

18. The system according to claim 17, further comprising said one of said plurality of firmware images being selected to use to reboot said one of said plurality of partitions.

19. The system according to claim 17, further comprising a different, unique firmware image identifier being associated with each of said plurality of firmware images.

20. The system according to claim 17, further comprising:
a different, unique firmware image identifier being associated with each of said plurality of firmware images;
a different partition table being associated with each one of said plurality of partitions;
an indicator being provided within each said different partition table, said indicator indicating whether one of said plurality of partitions that is associated with said partition table needs to be rebooted; and
an identifier being provided within each said different partition table, said identifier identifying one of said plurality of firmware images.

21. The system according to claim 17, further comprising:
said computer system for routinely checking each said partition table to determine whether said indicator included within each said partition table indicates that one of said plurality of partitions associated with each said partition table is to be rebooted;
in response to a determination that an indicator indicates that one of said plurality of partitions needs to be rebooted, said computer system for rebooting said one of said plurality of partitions having said indicator that indicates said need to be rebooted.

22. The system according to claim 21, further comprising:
an identifier being retrieved from said partition table that includes said indicator that indicates said need to be rebooted, said identifier one of said plurality of firmware images; and
said computer system for rebooting only said one of said plurality of partitions that includes said indicator that indicates said need to be rebooted utilizing said identifier retrieved from said partition table associated with said one of said plurality of partitions.

23. The system according to claim 17, further comprising:
a listing of said plurality of partitions;
a listing of said plurality of different firmware images;
means for receiving a selection of one of said plurality of partitions that is to be rebooted; and
means for receiving a selection of one of said plurality of firmware images to use to reboot said selected one of said plurality of partitions.

24. The system according to claim 23, further comprising:
an indicator in a partition table associated with said selected one of said plurality of partitions being set, said indicator indicating that said one of said plurality of partitions has been selected to be rebooted; and
an identification of said selected one of said plurality of firmware images being stored in said partition table associated with said selected one of said plurality of partitions.

* * * * *